United States Patent
Park et al.

(10) Patent No.: US 12,074,469 B2
(45) Date of Patent: Aug. 27, 2024

(54) ELECTRONIC DEVICE FOR CHARGING BATTERY BASED ON DIRECT CHARGING AND OPERATING METHOD OF THE ELECTRONIC DEVICE

(71) Applicant: SAMSUNG ELECTRONICS CO., LTD., Suwon-si (KR)

(72) Inventors: Sejong Park, Anyang-si (KR); Minkyu Kwon, Hwaseong-si (KR); Taejeong Kim, Hwaseong-si (KR); Junhan Bae, Seoul (KR); Suji Lee, Incheon (KR); Hyeonje Choe, Seoul (KR)

(73) Assignee: Samsung Electronics Co., Ltd. (KR)

( * ) Notice: Subject to any disclaimer, the term of this patent is extended or adjusted under 35 U.S.C. 154(b) by 311 days.

(21) Appl. No.: 17/340,045

(22) Filed: Jun. 6, 2021

(65) Prior Publication Data
US 2022/0045538 A1 Feb. 10, 2022

(30) Foreign Application Priority Data
Aug. 4, 2020 (KR) ........................ 10-2020-0097537

(51) Int. Cl.
*H02J 7/00* (2006.01)
(52) U.S. Cl.
CPC .... *H02J 7/007182* (2020.01); *H02J 7/00718* (2020.01)
(58) Field of Classification Search
None
See application file for complete search history.

(56) References Cited

U.S. PATENT DOCUMENTS

| | | |
|---|---|---|
| 6,967,469 B2 | 11/2005 | Yamamoto et al. |
| 8,174,241 B2 | 5/2012 | Kojima et al. |
| 8,405,362 B2 | 3/2013 | Martin et al. |
| 8,436,585 B2 | 5/2013 | Yano |
| 9,948,124 B2 | 4/2018 | Haberland |
| 10,252,627 B2 | 4/2019 | Miller |
| 10,411,494 B2 | 9/2019 | Tian et al. |
| 2012/0126820 A1* | 5/2012 | Tan ...................... H02J 7/0013 324/434 |
| 2016/0006273 A1* | 1/2016 | Reed ................... H02J 7/00712 320/162 |
| 2018/0145517 A1 | 5/2018 | Krishna et al. |
| 2019/0252905 A1 | 8/2019 | Suzuki et al. |

FOREIGN PATENT DOCUMENTS

| | | |
|---|---|---|
| JP | 2018098994 A | 6/2018 |
| KR | 100156854 | 11/1998 |
| KR | 101181109 | 9/2012 |
| KR | 1020180104537 | 9/2018 |

* cited by examiner

Primary Examiner — Arun C Williams
(74) Attorney, Agent, or Firm — Fish & Richardson P.C.

(57) ABSTRACT

An electronic device includes a charging integrated circuit (IC) including a direct charging circuit that charges a battery; and an application processor that issues a request to an external power source to output a maximum voltage corresponding to a target current, performs a ramp-up operation on a charging current input to the charging IC on the basis of the maximum voltage, compensates for a difference between the charging current and the target current in response to the charging current entering a constant current period, and enters a sleep mode during the constant current period in response to that the charging current reaching the target current.

20 Claims, 8 Drawing Sheets

ELECTRONIC DEVICE FOR CHARGING BATTERY BASED ON DIRECT CHARGING AND OPERATING METHOD OF THE ELECTRONIC DEVICE

CROSS-REFERENCE TO RELATED APPLICATION

A claim for priority under 35 U.S.C. § 119 is made to Korean Patent Application No. 10-2020-0097537, filed on Aug. 4, 2020, in the Korean Intellectual Property Office, the entirety of which is hereby incorporated by reference.

BACKGROUND

The present disclosure relates to a charging management chip, and more particularly to a charging management chip for charging a battery on the basis of a direct charging scheme, and an operating method of a charging management chip.

Electronic systems such as mobile devices or portable devices employ a battery for supplying power. Various methods may be used for charging batteries of mobile or portable devices. For example, a battery may be charged based on a direct charging scheme using a charger which supports a direct charging function. As another example, a battery may be charged based on a switching charging scheme using a normal charger. Generally, a direct charging scheme may have greater charging efficiency than a switching charging scheme.

SUMMARY

The inventive concepts provide a charging management chip and an operating method thereof, in which a processor enters a sleep mode while direct charging is being performed, thereby improving charging efficiency.

Embodiments of the inventive concepts provide an electronic device including a charging integrated circuit (IC) including a direct charging circuit that charges a battery; and an application processor that issues a request to output a maximum voltage corresponding to a target current to an external power source, performs a ramp-up operation on a charging current input to the charging IC based on the maximum voltage, compensates for a difference between the charging current and the target current in response to the charging current enters a constant current period, and enters a sleep mode during the constant current period in response to the charging current reaching the target current.

Embodiments of the inventive concepts provide an operating method of an electronic device including a charging integrated circuit (IC) and an application processor, the operating method including issuing, by the application processor, a request to output a maximum voltage corresponding to a target current to an external power source; performing, by the application processor, a ramp-up operation on a charging current input to the charging IC based on the maximum voltage; compensating, by the application processor, for a difference between the charging current and the target current in response to the charging current entering a constant current period; and entering, by the application processor, a sleep mode during the constant current period in response to the charging current reaching the target current.

Embodiments of the inventive concepts still further provide a charging integrated circuit (IC) including a direct charging circuit that charges a battery; and a microprocessor that issues a request to output a maximum voltage corresponding to a target current to an external power source, performs a ramp-up operation on a charging current input to the charging IC based on the maximum voltage, compensates for a difference between the charging current and the target current in response to the charging current entering a constant current period, and enters a sleep mode during the constant current period in response to the charging current reaching the target current.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
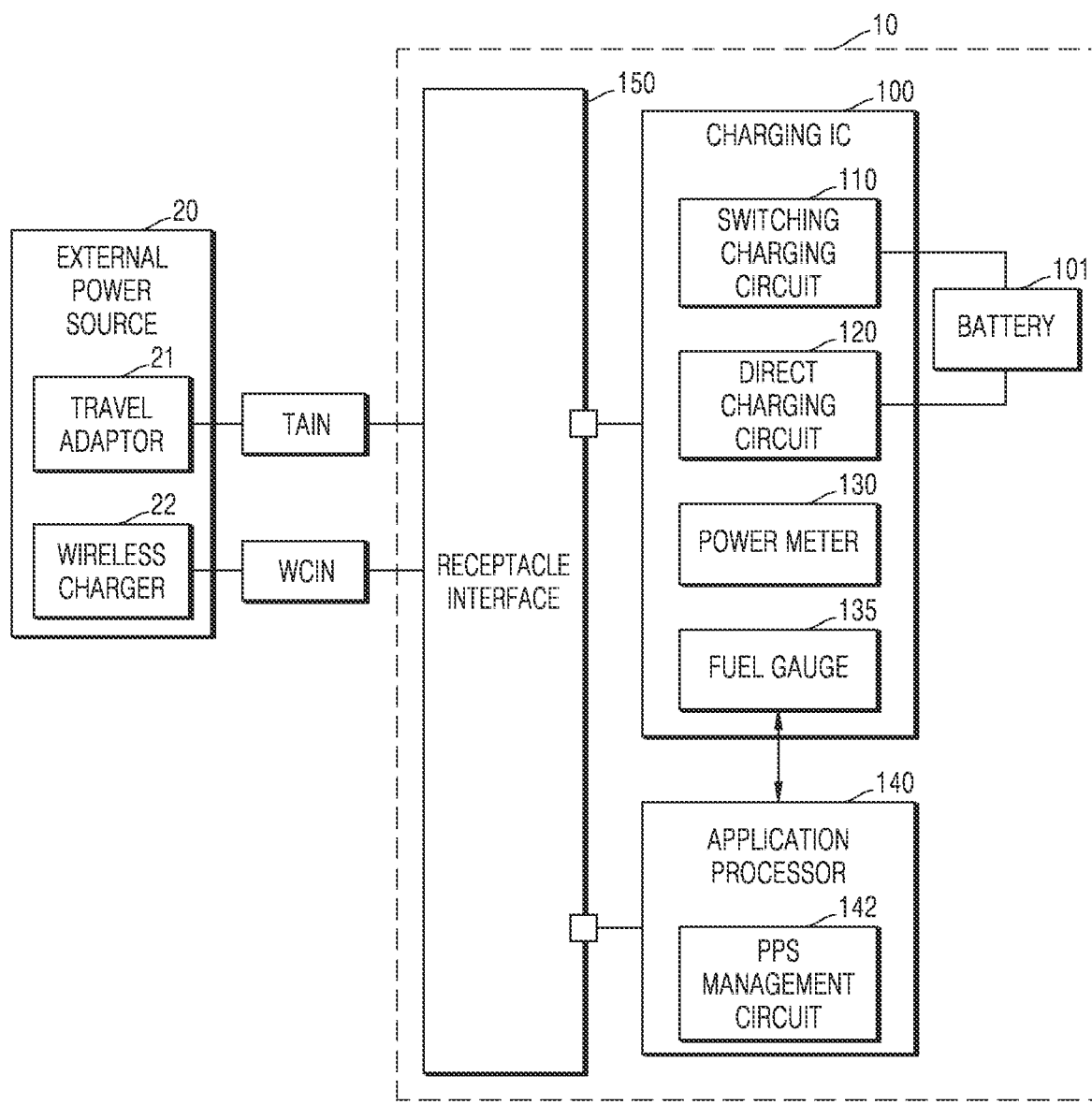
FIG. 1 illustrates a block diagram of an electronic device and an external power source according to embodiments of the inventive concepts.

FIG. 1 illustrates a block diagram of an electronic device 10 and an external power source 20, according to embodiments of the inventive concepts.

Referring to FIG. 1, in order to charge a battery 101 included in the electronic device 10, the electronic device 10 may be connected to the external power source 20 by wire or wirelessly.

The electronic device 10 according to various embodiments may be implemented as various systems. For example, the electronic device 10 may be implemented as any of various kinds of devices such as smartphones, tablet personal computers (PCs), mobile phones, video phones, e-book readers, desktop PCs, laptop PCs, netbook computers, workstations, servers, personal digital assistants (PDAs), portable multimedia players (PMPs), MP3 players, mobile medical devices, cameras, and wearable devices, or the like.

According to various embodiments, the electronic device 10 may include a charging integrated circuit (IC) 100, the battery 101 charged by the charging IC 100, and an application processor 140.

According to an embodiment, the charging IC 100 may be implemented as various types, and may for example be implemented as one semiconductor device (or a semiconductor chip or a semiconductor package). According to embodiments, the charging IC 100 may include a switching charging circuit 110 and a direct charging circuit 120. Here, in a case where the charging IC 100 is implemented as one semiconductor chip, various circuits included in the switching charging circuit 110 and the direct charging circuit 120 may be provided on one (or the same) semiconductor substrate. Also, the circuits included in the switching charging circuit 110 and the direct charging circuit 120 may be formed on the same semiconductor substrate by using the same semiconductor process.

The external power source 20 may supply power to the electronic device 10. According to various embodiments, the external power source 20 may include a travel adaptor (TA) 21 and a wireless charger 22.

The wireless charger 22 may wirelessly transmit power through air instead of supplying power through a wire, and thus may wirelessly charge the electronic device 10. According to various embodiments, the wireless charger 22 may transmit power on the basis of various wireless charging schemes such as for example a magnetic induction scheme, a magnetic resonance scheme, an electromagnetic induction scheme, and WiTricity™.

The TA 21 may supply power through a wire connected to the charging IC 100 of the electronic device 10. The TA 21 may convert 110 V or 220 V alternating current (AC), which is household power, or power supplied from another power supply, into direct current (DC) power needed for charging the battery 101, and may provide the DC power to the electronic device 10. According to various embodiments, the TA 21 may support direct charging. For example, the application processor 140 may determine whether the TA 21 supports direct charging, based on a resistance value of a configuration channel (CC) pin.

As an implementation example, an electronic system with the charging IC 100 embedded therein may include a wired charge interface TAIN and a wireless charge interface WCIN. Power from the TA 21 may be provided to the charging IC 100 through the wired charge interface TAIN, and power from the wireless charger 22 may be provided to the charging IC 100 through the wireless charge interface WCIN. According to embodiments, at least a portion of power from each of the TA 21 (which may be characterized as a wired charger) and the wireless charger 22 may be used as charging power for charging the battery 101.

The wired charge interface TAIN may include various kinds of connectors such as a universal serial bus (USB) for example and may be connected to the TA 21 through a connector. Also, the wireless charge interface WCIN may include a coil (for example, a conductive pattern) and a wireless charging IC and may wirelessly transmit/receive power to/from the wireless charger 22 such as a charging pad.

The charging IC 100 may charge the battery 101 by using various methods such as a normal charging scheme, a fast charging scheme, a direct charging scheme, and a programmable power supply (PPS) scheme. For example, the switching charging circuit 110 may charge the battery 101 by using the normal charging scheme and the fast charging scheme, and the direct charging circuit 120 may charge the battery 101 by using the direct charging scheme. The direct charging scheme may be a method which directly provides the battery 101 with power supplied from the external power source 20 and which may enhance power efficiency, thereby decreasing the occurrence of heat and shortening a charging time of the battery 101. The PPS scheme may denote the fast charging scheme which satisfies various standards such as quick charge (QC) and adaptive fast charge (AFC).

For example, a charger may support only a normal charging function or scheme, or may support a fast charging function or scheme. Based on the kind of charger, the switching charging circuit 110 may perform a normal charging operation of supporting a charging capacity of about 5 W to about 15 W, or may perform a fast charging operation of supporting a charging capacity of about 15 W to about 20 W. Such a switch charging scheme may have charging efficiency of about 90% to about 93%. On the other hand, in a case where a charger supports a direct charging function or scheme, the direct charging circuit 120 may perform a direct charging operation which has the charging efficiency of about 96% to about 98% and which may be high in charging efficiency of direct charging, and thus a heat dissipation characteristic may be enhanced.

Each of the switching charging circuit 110 and the direct charging circuit 120 may include a charging path which transfers charging power from a charger to the battery 101. For example, the switching charging circuit 110 or the direct charging circuit 120 may selectively charge the battery 101 or the switching charging circuit 110 and the direct charging circuit 120 may together charge the battery 101.

According to an embodiment, each of switching charging circuit 110 and the direct charging circuit 120 may include a plurality of circuits for switching the charging power, and the application processor 140 may control the circuits to change a charging scheme of the battery 101. Also, the charging IC 100, which in some embodiments may be implemented as one semiconductor chip and thus may be characterized as a charging management chip, may include one or more terminals connected to external devices. For example, the charging IC 100 may include a plurality of terminals connected to the wired charge interface TAIN and the wireless charge interface WCIN, and a plurality of terminals connected to the battery 101.

According to various embodiments, the application processor 140 may control overall operations of the electronic device 10. According to an embodiment, the application processor 140 may control the charging IC 100 to adjust a state of charge of the battery 101. For example, the application processor 140 may receive information Info_B (not shown in FIG. 1) about a state of the battery 101 from the charging IC 100, and may issue a request to the TA 21 to vary a charging current and a charging voltage on the basis of the information Info_B about the state of the battery 101. According to an embodiment, the application processor 140 may further include a PPS management circuit 142. When a level of the charging current differs from that of a target current, the PPS management circuit 142 may vary an output voltage field value and/or an output current field value each included in a PPS message, and may transmit the varied output voltage field value and/or output current field value to the TA 21. The PPS management circuit 142 may thus correspond to a circuit which performs control so that a level of the charging current matches a level of the target current.

According to various embodiments, the electronic device 10 may include a receptacle interface 150. The receptacle interface 150 may connect the electronic device 10 to the external power source 20 through a USB cable. In an embodiment, the receptacle interface 150 may correspond to a USB type-C interface, and the USB cable may correspond to a USB type-C cable. The USB type-C interface may be implemented based on definition of USB 2.0 or USB 3.1. The receptacle interface 150 may include a plurality of pins. The plurality of pins may include a pin for supplying power, a pin for transmitting data, and a configuration channel (CC) pin.

The charging IC 100 may further include a power meter 130 and a fuel gauge 135. In various embodiments, the power meter 130 may obtain information about each of an input/output voltage and current. The power meter 130 may sense a level of each of a charging voltage and a charging current which are output from the charging IC 100.

In various embodiments, the fuel gauge 135 may sense the battery 101. For example, the fuel gauge 135 may sense a state of charge (SoC), a charging voltage, a charging current, and a battery temperature of the battery 101. The SoC may be a ratio of a current capacity to a maximum capacity of the battery 101 and may be defined as a percentage (%) unit.

In various embodiments, the battery 101 may include at least one battery cell. For example, the battery 101 may be a multi-cell battery including a plurality of battery cells serially connected to one another. As another example, the battery 101 may be to a single cell battery including one battery cell. When the electronic device 10 is connected to the external power source 20, the battery 101 may be supplied with power through the charging IC 100. In various embodiments, the battery 101 may for example include a nickel cadmium (Ni—Cd) battery, a nickel hydrogen or nickel-metal hydride (Ni-MH) battery, and a lithium ion battery, but the inventive concepts however are not limited thereto and other types of batteries may be included.

In the above-described embodiments, it is illustrated that the charging IC 100 performs charging of the battery 101 on the basis of control by the application processor 140, but the inventive concepts however are not limited thereto. In various embodiments, the charging IC 100 may further include a microcontroller (MCU). The MCU may be a dedicated controller for controlling charging of the battery 101.

Figure 2:
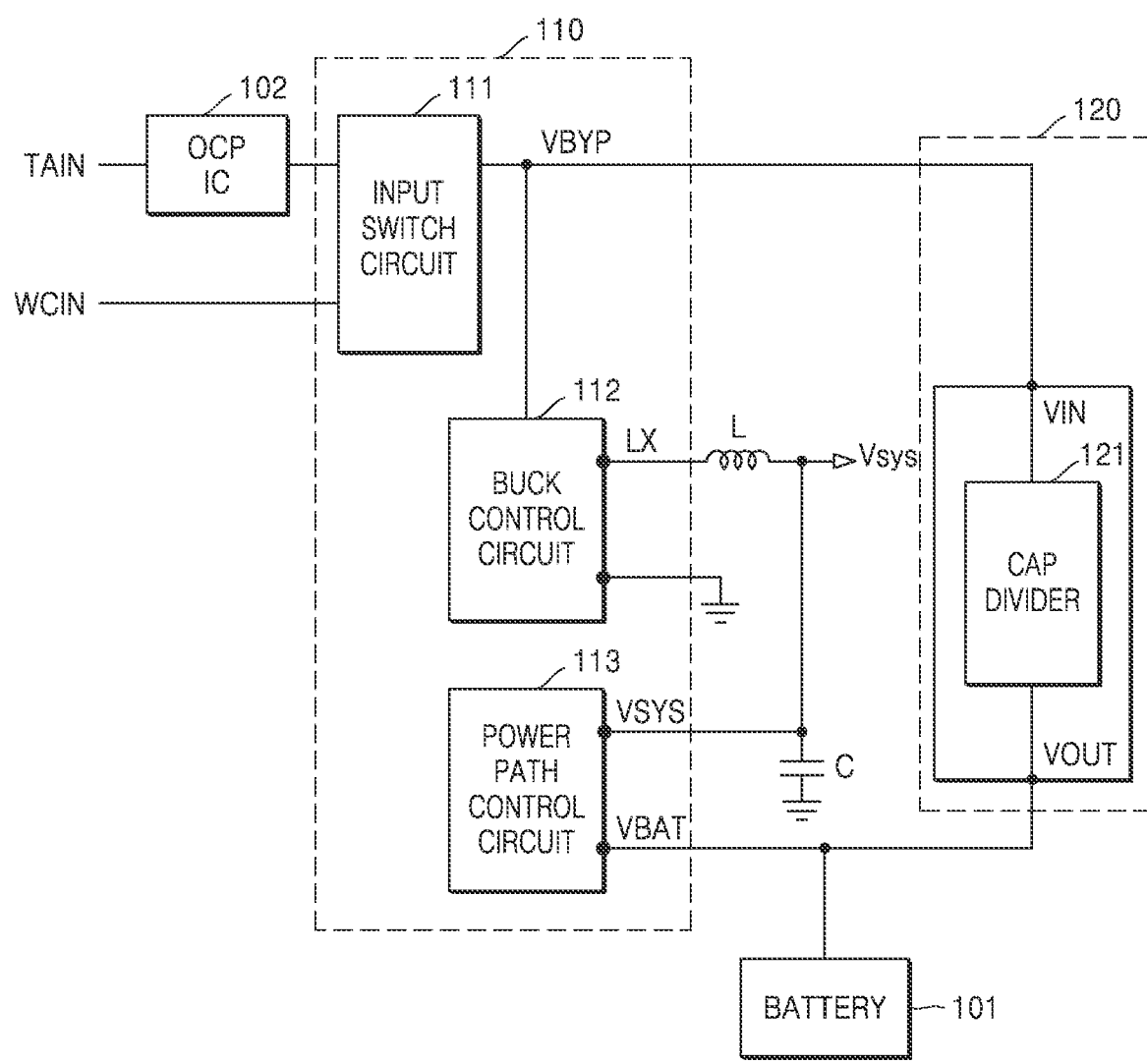
FIG. 2 illustrates a block diagram of a charging integrated circuit (IC) according to embodiments of the inventive concepts.

FIG. 2 illustrates a block diagram of a charging IC 100 according to embodiments of the inventive concepts.

Referring to FIG. 2, a switching charging circuit 110 may include an input switching circuit 111, a buck control circuit 112, and a power path control circuit 113. Also, a direct charging circuit 120 may include a switching circuit 121 connected between an input node VIN and an output node VOUT. The switching circuit 121 may for example be a capacitor divider, and thus is denoted as a "cap divider." Also, according to the above-described embodiment, the charging IC 100 may be connected to a plurality of circuit devices associated with charging of the battery 101, and for example an inductor L and a capacitor C connected to one or more nodes of the switching charging circuit 110 are further illustrated.

Also, as illustrated in FIG. 2, an over current protection circuit (OCP) IC 102 may be further included in the electronic device 10, and charging power from a wired charger (e.g., TA 21) may be provided to the charging IC 100 through the OCP IC 102. As an example, the OCP IC 102 may be implemented as a separate semiconductor chip, and thus the OCP IC 102 may be disposed outside the charging IC 100. When a current provided from the wired charger corresponds to, or is equal to or greater than, an over current, the OCP IC 102 may prevent power from the wired charger from being provided to the charging IC 100, thereby preventing damage to internal circuits of the charging IC 100.

The input switching circuit 111 may include one or more switches and may perform a switching operation on charging power from each of the wired charger (e.g., TA 21) and a wireless charger (e.g., wireless charger 22) to transfer the charging power to the charging IC 100. For example, the input switching circuit 111 may provide the charging power to the buck control circuit 112, or may directly provide the charging power to the direct charging circuit 120 through a first node VBYP.

The buck control circuit 112 may control an operation of converting the charging power received through the input switching circuit 111 into a voltage or a current having a level suitable for charging the battery 101, and moreover may control an operation of converting power provided from the battery into a voltage or a current having a level suitable for use by components/circuitry within an electronic system including electronic device 10. For example, the buck control circuit 112 may include one or more switches and may control the switches on the basis of various modes, and thus may control a charging operation or an operation of generating a system voltage Vsys. The system voltage Vsys may denote a voltage which is provided to the application processor 140 and to other elements. The buck control circuit 112 may be connected to one end of an external inductor L through a second node LX, and may provide the charging power to the second node LX on the basis of the above-described switching operation.

The power path control circuit 113 may control the power path so that the charging power provided from the charger (i.e., external power source 20) is provided to the battery 101, or may perform an operation of controlling the power path so that the power from the battery 101 is provided as the system voltage Vsys used by the components within the electronic system. The power path control circuit 113 may be connected to a third node VSYS and a fourth node VBAT, and may perform an operation of controlling the power path.

For example, the power path control circuit 113 may include one or more switches and may control the power path so that a portion of power provided from the charger is provided as charging power to the battery 101 and the other portion of the power is provided as the system voltage Vsys used by the components within the electronic system. As an operation example, when the electronic system is turned off, the power provided from the charger may be provided as charging power to the battery 101, and when the electronic system is turned on a portion of the power provided from the charger may be provided as charging power to the battery 101.

The switching circuit 121 included in the direct charging circuit 120 may include one or more switches, and an electrical connection between the input node VIN and the output node VOUT may be controlled based on a switching state of the switching circuit 121. For example, the direct charging circuit 120 may perform a function of a voltage divider (or a capacitor divider) and may divide charging power applied to the input node VIN to provide a divided charging voltage to the output node VOUT, and the divided charging power transferred to the output node VOUT may be provided to the battery 101. The switching circuit 121 may be implemented as any of various types, and based on an implementation type of the switching circuit 121, power having the same level as that of the charging power provided to the input node VIN may be provided to the output node VOUT or power having a level different from that of the charging power provided to the input node VIN may be provided to the output node VOUT.

As described above, various elements illustrated in FIG. 2 may include one or more switches, and the switches may be controlled by control signals (not shown) generated by the charging IC 100. For example, the charging IC 100 may include a plurality of circuits which generate a control signal based on a voltage/current detected from various nodes thereof, or generate a control signal based on a result obtained by detecting a voltage/current of the battery 101, and the switches of the charging IC 100 may be controlled based on the detection result of the voltage/current.

Figure 3:
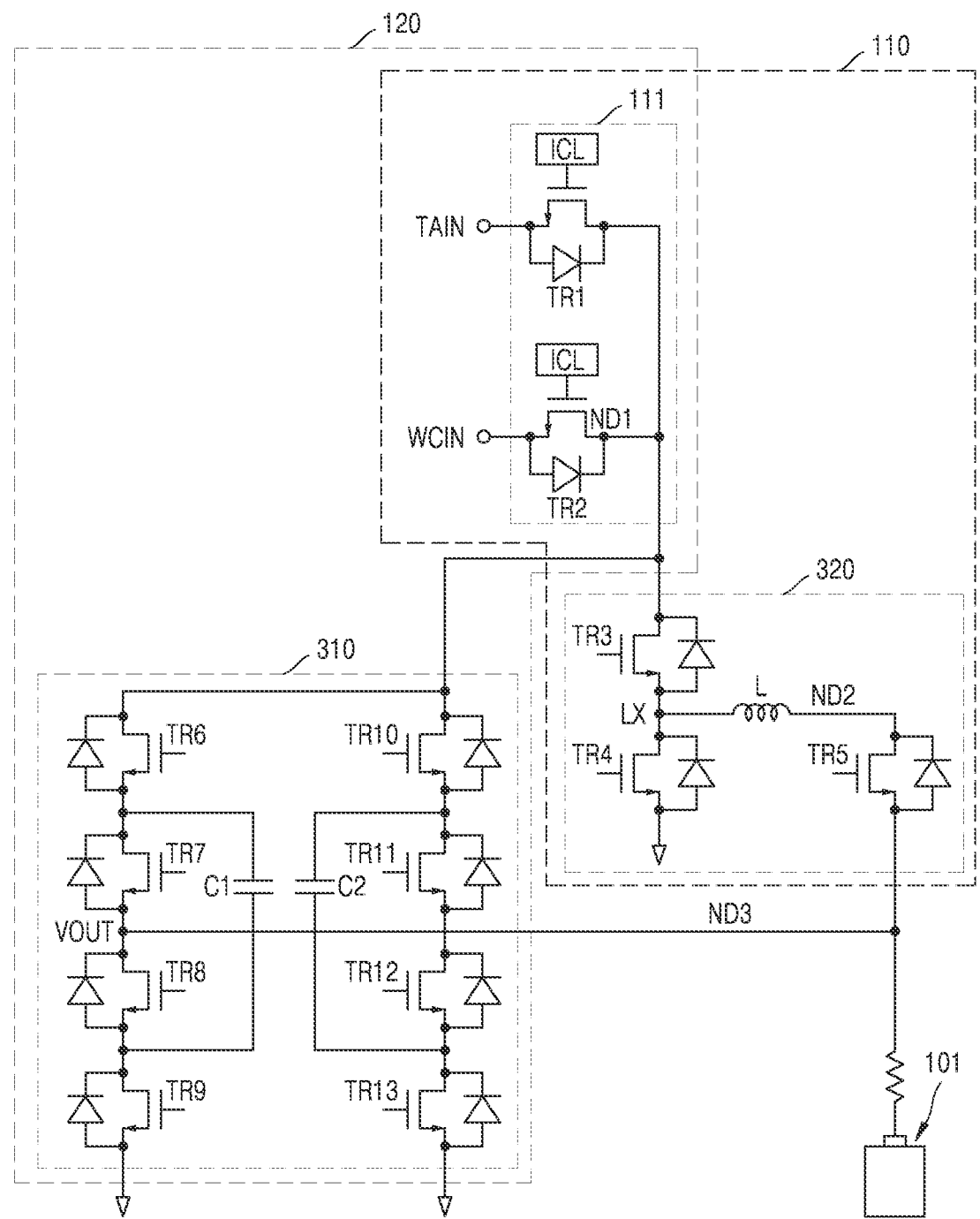
FIG. 3 illustrates an example of each of a switching charging circuit and a direct charging circuit, according to embodiments of the inventive concepts.

FIG. 3 illustrates an example of each of a switching charging circuit and a direct charging circuit, according to embodiments of the inventive concepts.

Referring to FIG. 3, a switching charging circuit 110, a direct charging circuit 120, and a battery 101 may be provided.

According to various embodiments, the switching charging circuit 110 and the direct charging circuit 120 may share an input power unit 111. Referring to FIG. 3, the input power unit 111 may include a first transistor TR1 connected between wired charge interface TAIN and a first node ND1, and wired input power provided by wired charge interface TAIN may for example correspond to power provided from the TA 210 of FIG. 1. The input power unit 111 may further include a second transistor TR2 connected between wireless charge interface WCIN and the first node ND1, and wireless input power provided by the wireless charge interface WCIN may for example correspond to power provided from the wireless charger 22 of FIG. 1. The first node ND1 may be connected to a cap divider 310 through a sixth transistor TR6 and a tenth transistor TR10, and may be connected to a buck converter 320 through a third transistor TR3.

According to an embodiment, when the third transistor TR3 is turned off, input power (i.e., charging power) may be transferred to the cap divider 310 through the input power unit 111 and may be transferred to the battery 101. That is, when a connection with the buck converter 320 is disconnected, the charging IC 100 may operate as the direct charging circuit 120.

According to another embodiment, when each of the sixth transistor TR6 and the tenth transistor TR10 are turned off, the input power (i.e., charging power) may be transferred to the buck converter 320 through the input power unit 111, and as the third transistor TR3 and a fourth transistor TR4 are alternately turned on and off at a certain period, so that the input power may be transferred to the battery 101. That is, when a connection with the cap divider 310 is disconnected, the charging IC 100 may operate as the switching charging circuit 110.

The switching charging circuit 110 may include the third transistor TR3, the fourth transistor TR4, a fifth transistor TR5, and an inductor L. For example, the third to fifth transistors TR3 to TR5 may be implemented as power switches. However, a structure of the switching charging circuit 110 is not limited thereto, and according to other embodiments the number of transistors and inductors included in the switching charging circuit 110 may be variously changed. The third transistor TR3 may be connected between the first node ND1 and a switching node LX, and may receive an input current through the first node ND1. The fourth transistor TR4 may be connected between the switching node LX and a ground node GND, and may provide a ground voltage to the switching node LX. The inductor L may be connected between the switching node LX and a first output node ND2. The fifth transistor TR5 may be connected between the first output node ND2 and a second output node ND3. The fifth transistor TR5 may be supplied with a voltage from the inductor L through the first output node ND2 and may provide the supplied voltage to the battery 101 through the second output node ND3. When the fifth transistor TR5 is turned on, a charging current ICHG (not shown in FIG. 3) may be provided to the battery 101 through the second output node ND3. Also, in an embodiment, when the fifth transistor TR5 is turned on, a battery current from the battery 101 may be provided to a system load (not shown in FIG. 3). The battery current may flow in a direction opposite to a charging current.

The direct charging circuit 120 may include a first capacitor C1, a second capacitor C2, and sixth to thirteenth transistors TR6 to TR13. The cap divider 310 may be referred to as a current doubler or an inverting charge pump. Referring to FIG. 3, in a charging operation based on the direct charging scheme, the first capacitor C1, the second capacitor C2, and switching operations of the sixth to thirteenth transistors TR6 to TR13 may be controlled. For example, while the first capacitor C1 is being charged the second capacitor C2 may be discharged, and while the first capacitor C1 is being discharged the second capacitor C2 may be charged. Therefore, a voltage of the output node VOUT provided to the battery 101 may maintain a constant level. A voltage value of the output node VOUT may be half of a voltage level of the first node ND1. Of note, the transistors TR1 to TR13 are depicted in FIG. 3 as a parallel connection of a transistor and a diode.

Figure 4:
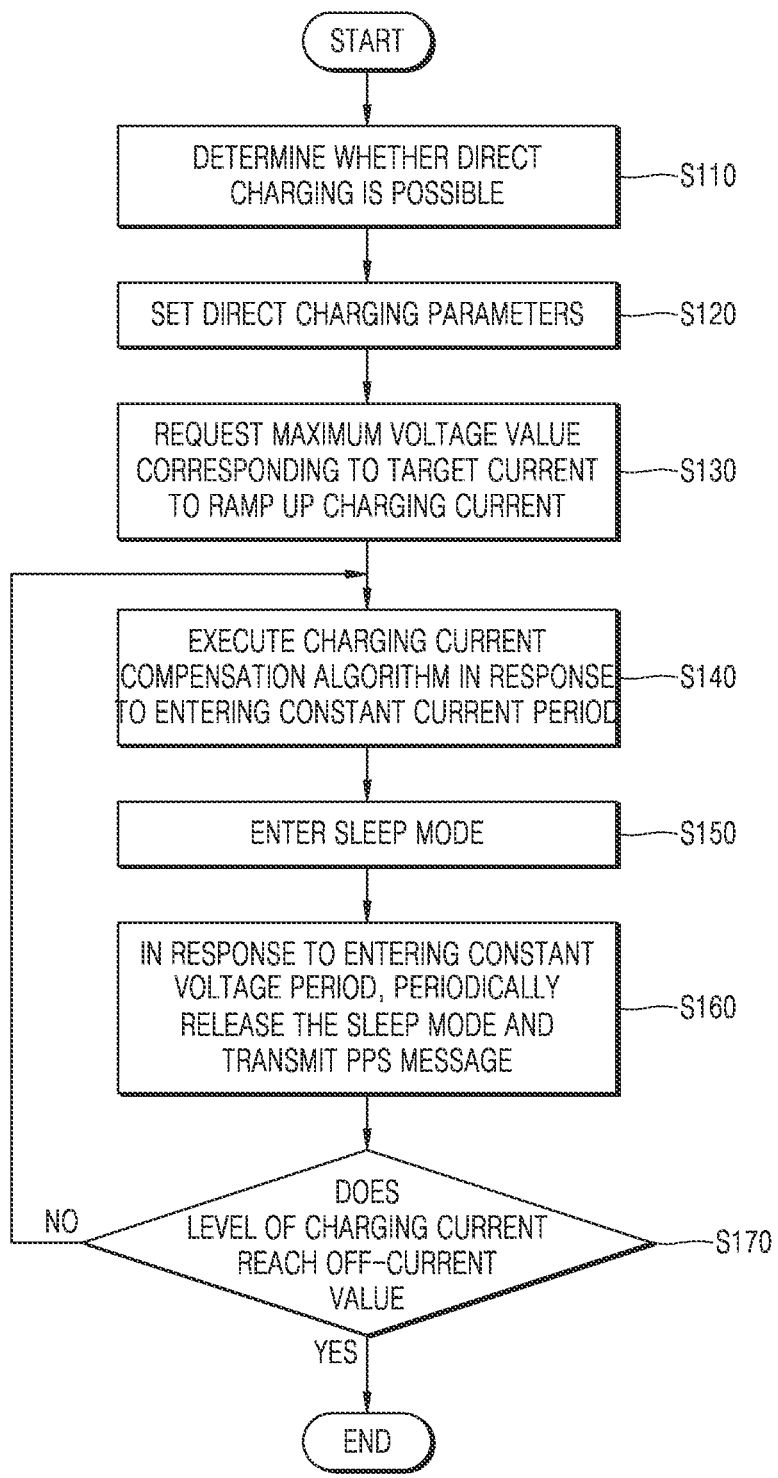
FIG. 4 illustrates a flowchart of an operation of an application processor according to embodiments of the inventive concepts.

FIG. 4 illustrates a flowchart of an operation of an application processor according to embodiments of the inventive concepts.

Referring to FIG. 4, in operation S110 the application processor 140 determines whether direct charging is possible. In operation S110, the TA 21 may be connected to the electronic device 10 through a wired cable. The application processor 140 may identify that the TA 21 for charging of the battery 101 is connected to the electronic device 10 by checking the CC pin of the receptacle interface 150. The application processor 140 may determine whether the TA 21 supports direct charging based on a resistance value of the CC pin. Also, the application processor 140 may receive information Info_B about a current state of the battery 101 from the fuel gauge 135, and based thereon may determine whether it is possible to perform the direct charging. The information Info_B about a current state of the battery 101 may include information such as an SoC, a charging voltage, a charging current, and a battery temperature of the battery 101. The SoC may be a ratio of a current capacity to a maximum capacity of the battery 101 and may be defined as a percentage (%) unit.

For example, when a voltage value of the battery 101 is not more than 3.5 V, the application processor 140 may control the charging IC 100 so that the charging IC 100 performs charging by using the switching charging circuit 110 until the voltage value of the battery 101 reaches 3.5 V. As another example, when the voltage value of the battery 101 is more than 3.5 V but the SoC of the battery 101 is more than 95%, the application processor 140 may control the battery 101 by using the switching charging circuit 110 without using the direct charging circuit 120, to prevent overcharging of the battery 101. That is, when the voltage value of the battery 101 is more than 3.5 V and the SoC of the battery 101 is less than 95%, the application processor 140 may determine that it is possible to perform charging by using the direct charging circuit 120.

In operation S120, the application processor 140 sets a plurality of direct charging parameters. The direct charging parameters may include an initial target TA voltage, an initial PPS message, a de-bounce time, a level of a top off current, and a floating battery value.

In operation S130, the application processor 140 performs a ramp-up operation up to a maximum voltage value corresponding to a target current. The application processor 140 may issue a request to the TA 21 to output the maximum voltage value through the receptacle interface 150. The ramp-up operation may be performed on a charging current on the basis of the maximum voltage value output from the TA 21. In this case, a charging current value input to the battery 101 may differ from a value of the target current. This is because when the TA 21 receives a request for a maximum voltage value which is greater than an initial request voltage, a maximum allowable current has to be output, but due to unstable operation of the TA 21, a charging current having a value different from the maximum allowable current has to be output.

In operation S140, the application processor 140 executes a charging current compensation algorithm in response to entering a constant current (CC) period. Because a charging current output from the TA 21 differs from the target current, the charging current compensation algorithm may denote an algorithm for controlling a value of a current and/or a voltage which is requested from the TA 21 so that the charging current tracks the target current. When the charging current compensation algorithm is executed, the TA 21 may stably output the target current.

In operation S150, the application processor 140 enters a sleep mode. The sleep mode may denote that the application processor 140 decreases a resource and power used thereby to enter an inactive state. The sleep mode may for example be referred to as various terms including a low power mode, an idle mode, an inactive mode, an inactive state, and a deactivation state. When the application processor 140 enters the sleep mode, the application processor 140 may bypass monitoring of a charging current and a charging voltage input from the TA 21. Because the application processor 140 enters the sleep mode, power consumption of the application processor 140 may be largely reduced, and thus charging efficiency may be more improved and the occurrence of heat may also decrease.

In operation S160, in response to entering a constant voltage (CV) period, the application processor 140 periodically releases the sleep mode and transmits a PPS message. When a voltage value of the battery 101 reaches a predetermined value, the application processor 140 may deactivate automatic PPS. When automatic PPS is deactivated, the application processor 140 may not maintain the sleep mode during all of the CV period and may perform a wake-up operation at every certain period to transmit the PPS message to the TA 21. For example, the certain period may be 10 seconds. The application processor 140 may repeat an operation of releasing the sleep mode at every certain period, monitoring a charging current value input from the TA 21 for about 100 ms to about 150 ms, transmitting the PPS message, and entering the sleep mode again.

In operation S170, the application processor 140 determines whether a level of a charging current input from the TA 21 reaches an off-current value. The application processor 140 may release the sleep mode, receive the information Info_B about the SoC of the battery 101 from the fuel gauge 135, and sense a level of the charging current. The off-current value may denote a certain current value for preventing overcharging by performing charging by using the switching charging circuit 110 when the SoC of the battery 101 is close to 100%. For example, the off-current value may be 1 A.

In an embodiment, when the level of the charging current reaches the off-current value (Yes in operation S170), the application processor 140 may activate the switching charging circuit 110 and may deactivate the direct charging circuit 120. Also, when the level of the charging current does not reach the off-current value (No in operation S170), the application processor 140 repeats operation S140 because direct charging of the battery 101 is further needed. At this time, the application processor 140 may vary a parameter for determining whether to enter the CC period and to enter the CV period.

Figure 5:
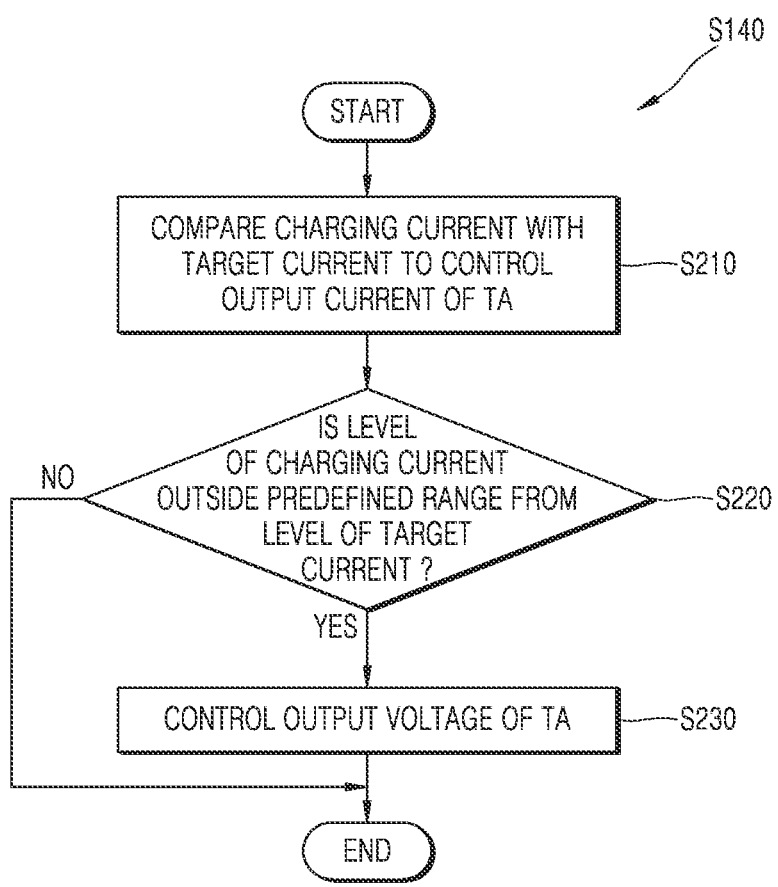
FIG. 5 illustrates a flowchart descriptive of executing a charging current compensation algorithm according to embodiments of the inventive concepts.

FIG. 5 illustrates a flowchart for executing a charging current compensation algorithm according to embodiments of the inventive concepts. That is, FIG. 5 illustrates charging current compensation that is performed according to embodiments of the inventive concepts.

Referring to FIG. 5, in operation S210, the application processor 140 compares a charging current with a target current to control an output current requested from the TA 21.

In operation S220, the application processor 140 determines whether a level of the charging current is outside a predefined range from a level of the target current.

In operation S230, the application processor 140 controls an output voltage of the TA 21.

According to the charging compensation algorithm, the application processor 140 may compare a value of the charging current with a value of the target current to issue a request to the TA 21 to vary an output current. For example, when the value of the charging current is greater than that of the target current, the application processor 140 may decrease a value of an output current field included in a PPS message and may transfer the PPS message to the TA 21. Here, the value of the output current field may increase or decrease by units of 50 mA. As another example, when the value of the charging current is less than that of the target current, the application processor 140 may increase the value of the output current field included in the PPS message.

According to various embodiments, in operation S210 the application processor 140 may issue a request to the TA 21 to vary an output current a predefined first number of times. For example, the predefined first number of times may correspond to 20 times. That is, the application processor 140 may perform 20 repetitions to vary the value of the output current field included in the PPS message and transfer the PPS message to the TA 21, and when the number of repetitions is more than 20, the application processor 140 may no longer perform an operation of varying the value of the output current field to track the target current. For example, this is because when the number of repetitions performed is not limited to such a predefined first number of times for example, the transmission of the PPS message may be repeated until the charging current reaches the target current during the CC period.

In operation S220, the application processor 140 determines whether the level of the charging current is outside the predefined range from the level of the target current. That is, in operation S210 the application processor 140 may repeatedly vary and request an output current field value of the TA 21 and thus may perform control so that an output current value of the TA 21 follows a target current value. The application processor 140 may also determine whether the level of the charging current is outside a predefined range, wherein the predefined range being a range of charging currents in which it is possible to track a corresponding value by varying an output current field. The predefined range may correspond to an upper bound value of 150 mA from the target current and a lower bound value of 50 mA from the target current. When the level of the charging current is 150 mA or more higher than the target current, or is 50 mA or more lower than the target current, and thus is outside the predefined range (Yes in operation S220), the application processor 140 performs operation S230 of controlling an output voltage of the TA 21. As another example, when the value of the charging current is within the predefined range (No in operation S220), the application processor 140 ends the charging current compensation algorithm. That is, when the value of the charging current is within the predefined range from the target current, the charging current may successively follow the target current, and thus the application processor 140 may enter the sleep mode during the CC period.

Figure 6:
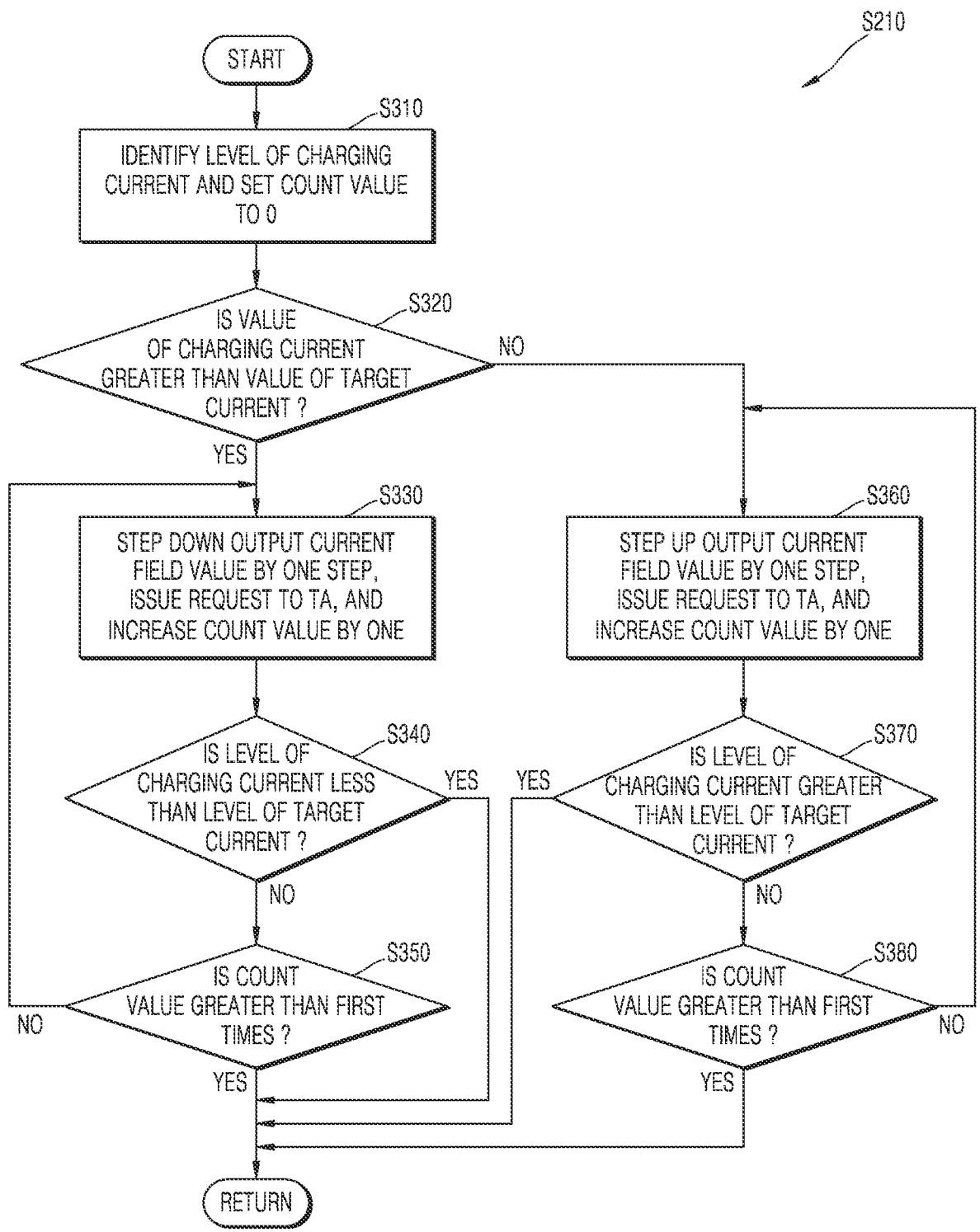
FIG. 6 illustrates a flowchart of an operation of varying an output current field value of a programmable power supply (PPS) message, according to embodiments of the inventive concepts.

FIG. 6 illustrates a flowchart of an operation of varying an output current field value of a PPS message, according to embodiments of the inventive concepts. This corresponds to operation S210 of FIG. 5.

Referring to FIG. 6, in operation S310 the application processor 140 identifies a level of a charging current and sets a count value to "0". The application processor 140 may receive information about the level of the charging current from the power meter 130. The count value may correspond to a value that is used for allowing the application processor 140 to vary a value of an output current field and track the number of transfers of a PPS message by using the TA 21. A time at which operation S310 is performed may correspond to a time at which a target current enters the CC (constant current) period after issuing a request to output a maximum voltage value with respect to the target current.

In operation S320, the application processor 140 determines whether a value of the charging current is greater than a value of the target current. Because the application processor 140 issues a request to output the maximum voltage value corresponding to the target current, a value of a current output from the TA 21 may differ from the target current. For example, when the level of the charging current is greater than that of the target current (Yes at operation S320), the application processor 140 performs operation S330, and when the level of the charging current is less than that of the target current (No at operation S320), the application processor 140 performs operation S360.

In operation S330, the application processor 140 steps down an output current field value by one step, issues a request to the TA 21, and increases a count value by one. The step may be a minimum unit for adjusting the output current field value, and in direct charging for supporting PPS, the minimum unit may for example correspond to 50 mA.

In operation S340, the application processor 140 determines whether the level (or value) of the charging current is less than that of the target current. That is, it is determined in operation S340 whether the level of the charging current has been reduced to be less than that of the target current on the basis of the application processor 140 only decreasing an output current field of the PPS message by one step and issuing a request to the TA 21. For example, when it is determined in operation S340 that the level of the charging current is less than that of the target current (Yes in operation S340), it may be determined that the level of the charging current identified in operation S310 is greater than but almost equal to that of the target current. That is, when it is determined in operation S340 that the level of the charging current is less than that of the target current, it may be understood that the level of the charging current is within the predetermined range of operation S220. That is, the application processor 140 may return to operation S220 and may end the charging current compensation algorithm. As another example, when it is determined in operation S340 that the level of the charging current is greater than that of the target current (No in operation S340), the application processor 140 may perform operation S350.

In operation S350, the application processor 140 determines whether the count value is greater than the predefined first number of times. For example, the predefined first number of times may have a predefined value of 20. However, the above-described embodiment is no limited thereto, and a value of the predefined first number of times may be variously changed by a manufacturer or a user. For example, when the count value is not greater than 20 (No in operation S350), this may denote that the number of operations, which includes stepping down the output current field value and issuing a request to the TA 21, is not greater than 20 times. As a result, the application processor 140 again repeats operation S330. On the other hand, when the count value is greater than the predefined first number of times (Yes in operation S350), the application processor 140 returns to operation S220 of FIG. 5 and determines whether the level of the charging current is within the predefined range from the target current.

In operation S360, the application processor 140 steps up the output current field value by one step, issues a request to the TA 21, and increases the count value by one. That is, because the level of the charging current is less than that of the target current, the application processor 140 may issue a request to the TA 21 to further increase the charging current by 50 mA in order for the level of the charging current to be closer to that of the target current.

In operation S370, the application processor 140 determines whether the level of the charging current is greater than that of the target current. That is, the application processor 140 determines whether the level of the charging current has been increased to be greater than that of the target current on the basis of the application processor 140 only increasing the output current field of the PPS message by one step and issuing a request to the TA 21. For example, when it is determined in operation S370 that the level of the charging current is greater than that of the target current (Yes in operation S370), it is determined that the level of the charging current identified in operation S310 is less than but almost equal to that of the target current. That is, when it is determined in operation S370 that the level of the charging current is greater than that of the target current (Yes in operation S370), it may be understood that the level of the charging current is within the predetermined range of operation S220. That is, the application processor 140 may return to operation S220 and may end the charging current compensation algorithm. As another example, when it is determined in operation S370 that the level of the charging current is less than that of the target current (No in operation S370), the application processor 140 performs operation S380. In operation S380, the application processor 140 determines whether the count value is greater than the predefined first number of times. Operation S380 is similar to operation S350, and detailed description of operation S380 will thus be omitted for brevity.

Figure 7:
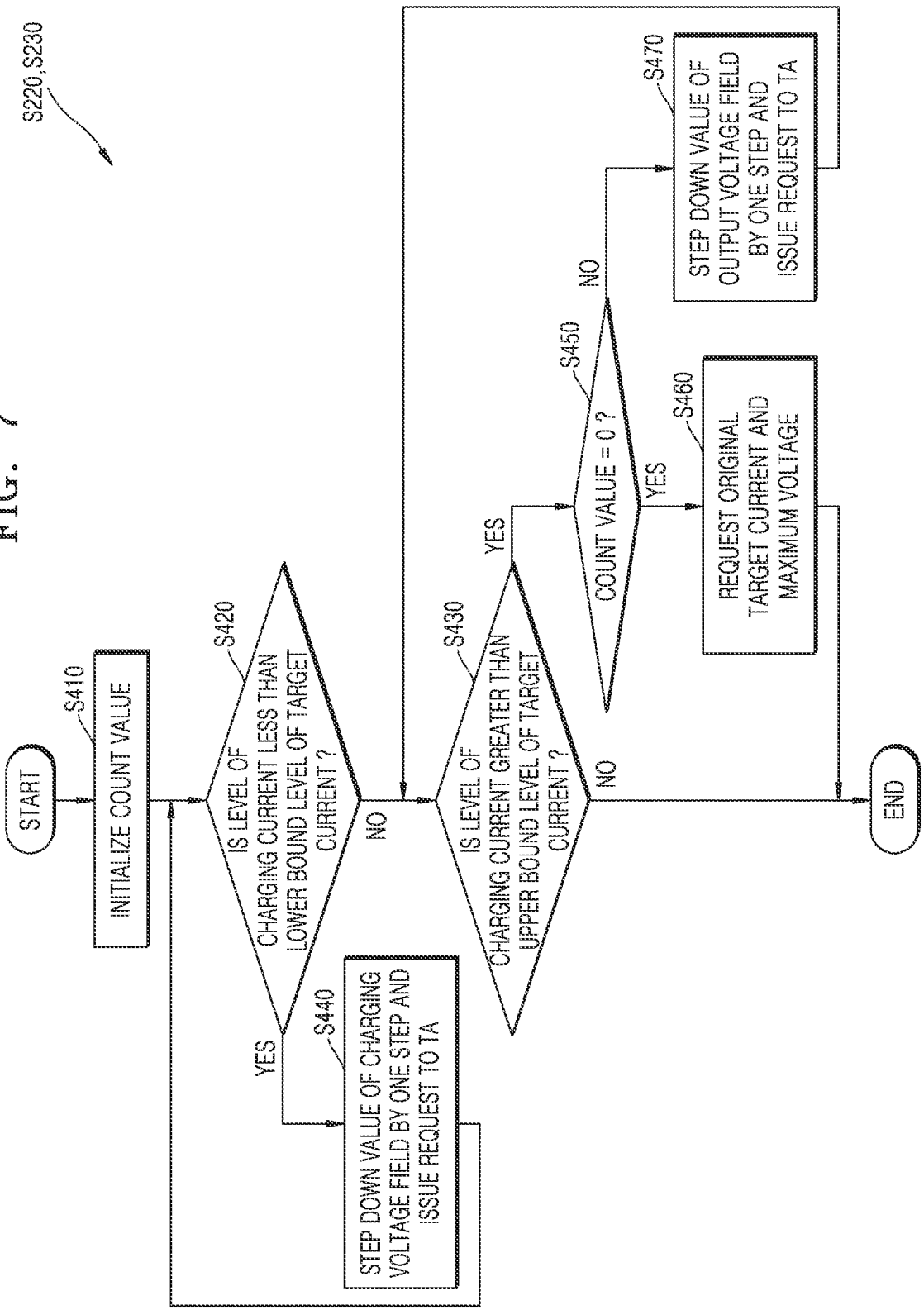
FIG. 7 illustrates a flowchart of an operation of varying an output voltage field value of a PPS message, according to embodiments of the inventive concepts.

FIG. 7 illustrates a flowchart of an operation of varying an output voltage field value of a PPS message, according to embodiments of the inventive concepts. FIG. 7 may correspond to a detailed flowchart of each of operations S220 and S230 illustrated in FIG. 5.

Referring to FIG. 7, in operation S410, the application processor 140 initializes a count value. That the application processor 140 performs operation S410 may denote that the application processor 140 repeated an operation of stepping down or stepping up the output current field value of the PPS message and issuing a request in operation S330 or operation S360 of FIG. 6 the predefined first number of times, but that the level of the charging current does not correspond to the level of the target current. That is, the application processor 140 may determine that the level of the charging current does not follow the level of the target current on the basis of only varying the output current field of the PPS message, and may thus perform an operation illustrated in FIG. 7 for varying the output voltage field of the PPS message. Therefore, in operation S410, the application processor 140 may initialize a count value increased while performing the operation of FIG. 6.

In operation S420, the application processor 140 determines whether the level of the charging current is less than a lower bound level of the target current. The lower bound level may correspond to, for example, 50 mA. When the level of the charging current is at least 50 mA less than that of the target current, the application processor 140 may define the TA 21 as a TA of a type where an error of an output current increases as a value of an output voltage field increases. That is, the TA 21 may be one of various types of travel adaptors, and a TA of a first type may correspond to a TA which outputs a lower current than the target current when a higher output voltage than a target voltage mapped to the target current is requested. A TA of a second type may correspond to a TA which outputs a higher current than the target current when a higher output voltage than a target voltage value mapped to the target current is requested. When it is determined in operation S420 that the level of the charging current is less than the lower bound level of the target current (Yes in operation S420), the application processor 140 may define the TA 21 which is currently connected to the electronic device 10 as the first type. Therefore, when it is determined that the level of the charging current is less than the lower bound level of the target current, the application processor 140 performs operation S440. As another example, when it is determined that the level of the charging current is greater than the lower bound level of the target current (No in operation S420), the application processor 140 performs operation S430.

In operation S430, the application processor 140 determines whether the level of the charging current is greater than an upper bound level of the target current. That is, this is because the level of the charging current is outside a predefined range of the target current when the level of the charging current is greater than the lower bound level of the target current (i.e., No in operation S420) and is greater than the upper bound level of the target current. When it is determined that the level of the charging current is less than the upper bound level of the target current (No in operation S430), the application processor 140 ends the charging current compensation algorithm. This is because the level of the charging current is within the predefined range of the target current because the level of the charging current is less than the upper bound level of the target current but is greater than the lower bound level of the target current.

In operation S440, the application processor 140 steps down a value of a charging voltage field by one step and transmits a PPS message to the TA 21. Because the application processor 140 determines that the TA 21 currently connected to the electronic device 10 is a TA of the first type, the application processor 140 may step down an output voltage field by one step and may transmit the PPS message to the TA 21. The step may be a minimum unit for adjusting an output voltage field value, and in direct charging for supporting PPS, the minimum unit may for example correspond to 20 mA. Although not shown in FIG. 7, the application processor 140 may increase, by one, a count value whenever a value of the output voltage field is stepped down and may determine whether the count value is greater than a predefined second number of times, before returning to operation S420.

In operation S450, the application processor 140 determines whether the count value is 0. That is, when the level of the charging current is greater than the upper bound level of the target current (Yes in operation S430), the application processor 140 additionally determines whether the count value is 0. This is because an output voltage field of the PPS message is stepped down at least once or more when the count value is not 0, in operation S440. For example, when the count value is 0 (Yes in operation S430), the application processor 140 performs operation S460. When the count value is not 0 (No in operation S450), because the output voltage field has been varied at a previous time, the application processor 140 again varies and monitors the output voltage field in operation S470.

In operation S460, when the count value is 0 (i.e., the output voltage field has not been varied) but the level of the charging current is greater than that of the target current, the application processor 140 again sets the charging current to an initially set target current and a maximum voltage value mapped thereto, and may continuously step down the output voltage field value.

In operation S470, the application processor 140 steps down the value of the output voltage field by one step and issues a request to the TA 21. Operation S470 is similar to operation S440, and further description thereof is omitted for brevity.

Figure 8:
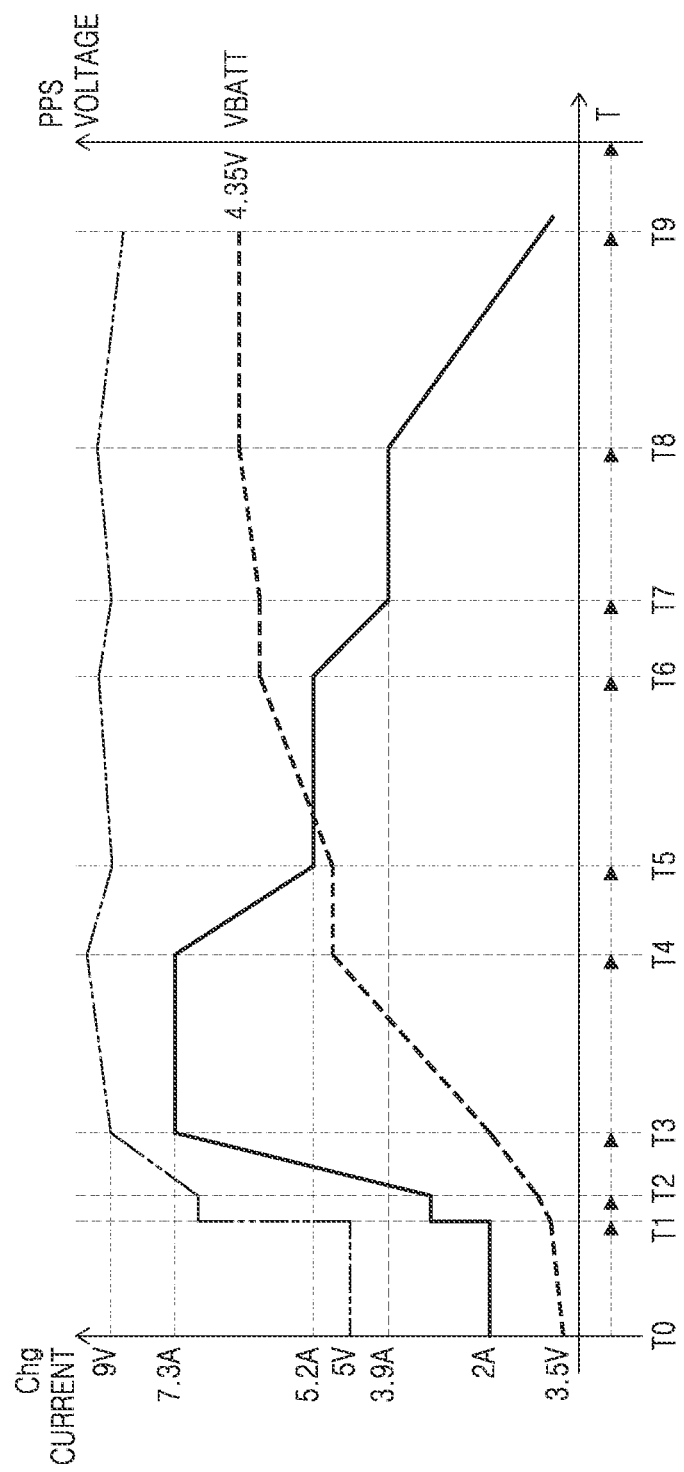
FIG. 8 illustrates a graph showing an output voltage, a charging current, and a battery voltage of a travel adaptor (TA) while direct charging is performed, according to embodiments of the inventive concepts.

FIG. 8 illustrates a graph showing an output voltage, a charging current, and a battery voltage of a TA (i.e., travel adaptor 21) while direct charging is being performed, according to embodiments of the inventive concepts. In FIG. 8 the dashed line indicates battery voltage, the solid line indicates a charging current provided by the TA21, and the dashed-solid line indicates the output voltage of the TA 21. Also, it should be understood that the current and voltage values in FIG. 8 are exemplary and should not be construed as limiting.

Referring to FIG. 8, a charging current, a battery voltage, and an output voltage of the TA 21 corresponding to FIG. 4 may be provided.

In an interval T0 to T1, the application processor 140 may determine whether it is possible to perform direct charging. That is, the application processor 140 may receive from the fuel gauge 135 information about a voltage and an SoC of the battery 101 at a time T0 and may determine whether the direct charging is possible. Referring to FIG. 8, it may be seen that an initial voltage of the battery 101 as indicated by the dashed line is less than 3.5 V. Therefore, in the interval T0 to T1, the application processor 140 does not perform the direct charging and instead charges the battery 101 on the basis of the switching charging scheme until the voltage of the battery 101 reaches 3.5 V by using the switching charging circuit 110.

In an interval T1 to T2, the application processor 140 may set a plurality of parameters for performing the direct charging. For example, the application processor 140 may request an initial voltage from the TA 21.

In an interval T2 to T3, the application processor 140 may perform an operation of ramping up a current. The interval T2 to T3 may be referred to as a ramp-up period. The application processor 140 may request a maximum voltage value, mapped to a target current value, from the TA 21. Referring to FIG. 8, the maximum voltage value may correspond to 9 V. The TA 21 may receive a request for the maximum voltage value instead of the target voltage value mapped to a target current value, and may output the maximum voltage value, and thus a charging current applied to the battery 101 may rapidly increase during the ramp-up period.

In an interval T3 to T4, the application processor 140 may enter the sleep mode. The interval T3 to T4 may correspond to a first CC (constant current) period where the battery 101 is quickly charged by maintaining the charging current with respect to a first value. According to various embodiments, in response to entering the first CC period at a time T3, the application processor 140 may execute the charging current compensation algorithm. Although not shown in FIG. 8, a level of the charging current may differ from that of the target current at a time T3. Because the TA 21 has received a maximum voltage which is higher than a target voltage, the TA 21 may output the charging current as having an error with respect to the level of the target current. As described above with reference to FIG. 5, the application processor 140 may control a PPS message value so that the application processor 140 steps up or steps down an output current field value to allow the level of the charging current to follow the level of the target current, with respect to the TA 21. Alternatively, when the level of the charging current does not reach the level of the target current on the basis of only varying the output current field value, the application processor 140 may vary a value of an output voltage field to execute the charging current compensation algorithm. For example, when compensation has been performed so that the level of the charging current is close to that of the target current, the application processor 140 may enter the sleep mode. Because the TA 21 receives a request for allowing an output voltage to be a maximum voltage in the ramp-up period, the application processor 140 may omit continuous monitoring and may enter the sleep mode, thereby minimizing the use of resources, decreasing power consumption, and reducing the occurrence of heat.

In an interval T4 to T5, the application processor 140 may periodically release the sleep mode and may transmit a PPS message to the TA 21. The interval T4 to T5 may correspond to a first CV (constant voltage) period where a voltage of the battery 101 as indicated by the dashed line is maintained as constant by decreasing the charging current as indicated by the solid line. During the first CV period, the application processor 140 has to reduce the level of the charging current while monitoring the charging current, and due to this, may not maintain the sleep mode. The application processor 140 may repeat an operation of waking up at every certain period to monitor the level of the charging current, stepping down the level of the charging current to transmit a PPS message to the TA 21, and again entering the sleep mode. A time taken for monitoring the charging current and transmitting the PPS message may be about 100 ms to about 150 ms, and thus, despite the first CV period, a driving time of the application processor 140 may be shortened compared to conventional schemes. At a time at which the first CV period ends, the application processor 140 may again set a voltage value of the battery 101 and a value of the target current for determining whether to enter a CC period and a CV period subsequent to the first CV period.

In an interval T5 to T6, the application processor 140 may enter the sleep mode. The interval T5 to T6 may correspond to a second CC period where the voltage of the battery 101 is charged while maintaining a second charging current value. According to various embodiments, when the level of the charging current differs from the level of the varied target current at a time T5, the application processor 140 may again execute the charging current compensation algorithm. The interval T5 to T6 and an interval T7 to T8 may be similar to the first CC period during the interval T3 to T4, and the interval T6 to T7 and an interval T8 to T9 may be similar to the first CV period during the interval T4 to T5. Description of details of these respective intervals T5 to T6, T7 to T8, T6 to T7, and T8 to T9 is thus omitted for brevity.

At a time T9, the application processor 140 may end the direct charging and may activate the switching charging circuit 110. That is, at the time T9, the level of the charging current may reach a top off-current value. When the level of the charging current reaches a top off-current value, the application processor 140 may deactivate the direct charging circuit 120 so as to prevent overcharging of the battery 101.

While the inventive concepts have been particularly shown and described with reference to embodiments thereof, it should be understood that various changes in form and detail may be made therein without departing from the spirit and scope of the following claims.

What is claimed is:
1. An electronic device comprising:
   a charging integrated circuit (IC) including a direct charging circuit configured to charge a battery; and
   an application processor configured to issue a request to output a maximum voltage corresponding to a target current to an external power source, perform a ramp-up operation on a charging current input to the charging IC based on the maximum voltage, compensate for a difference between the charging current and the target current in response to the charging current entering a constant current period, and enter a sleep mode during the constant current period in response to the charging current reaching the target current,
   wherein the ramp-up operation includes increasing the charging current from a first positive current at a first time to a second positive current at a subsequent second time, and
   wherein the second positive current is equivalent to the target current corresponding to the maximum voltage.

2. The electronic device of claim 1, wherein when a level of the charging current is greater than a level of the target current, the application processor is configured to transmit information issuing a command to decrease an output current, to the external power source, and
when the level of the charging current is less than the level of the target current, the application processor is configured to transmit information issuing a command to increase the output current to the external power source.

3. The electronic device of claim 2, wherein the application processor is configured to increase a count value by one when transmitting the information issuing the command to decrease the output current and when transmitting the information issuing the command to increase the output current, and
when the count value is greater than a predefined first number of times, the application processor is configured to bypass the transmitting the information.

4. The electronic device of claim 3, wherein the application processor is configured to compare a level of a first varied charging current with the level of the target current in response to transmitting the information issuing the command to decrease the output current, and
when the level of the first varied charging current is less than the level of the target current, the application processor is configured to enter the sleep mode, and
wherein the application processor is further configured to compare a level of a second varied charging current with the level of the target current in response to transmitting the information issuing the command to increase the output current, and
when the level of the second varied charging current is greater than the level of the target current, the application processor is configured to enter the sleep mode.

5. The electronic device of claim 3, wherein when the level of the charging current is less than an upper bound of the target current and is greater than a lower bound of the target current, the application processor is configured to enter the sleep mode.

6. The electronic device of claim 5, wherein when the level of the charging current is less than the lower bound of the target current, the application processor is configured to transmit information issuing a command to decrease an output voltage to the external power source.

7. The electronic device of claim 5, wherein when the level of the charging current is greater than the upper bound of the target current the application processor is configured to determine whether the count value is 0, and when the count value is 0 the application processor is configured to again issue the request to output the maximum voltage corresponding to the target current to the external power source.

8. The electronic device of claim 7, wherein when the count value is not 0, the application processor is configured to transmit information issuing a command to decrease an output voltage to the external power source.

9. The electronic device of claim 1, wherein in response to entering a constant voltage period during which a voltage of the battery is maintained to be constant, the application processor is configured to periodically release the sleep mode at predefined times and monitor a reduction in level of the charging current.

10. An operating method of an electronic device including a charging integrated circuit (IC) and an application processor, the operating method comprising:

issuing, by the application processor, a request to output a maximum voltage corresponding to a target current to an external power source;
performing, by the application processor, a ramp-up operation on a charging current input to the charging IC based on the maximum voltage;
compensating, by the application processor, for a difference between the charging current and the target current in response to the charging current entering a constant current period; and
entering, by the application processor, a sleep mode during the constant current period in response to the charging current reaching the target current,
wherein the ramp-up operation includes increasing the cvc current from a first positive current at a first time to a second positive current at a subsequent second time, and
wherein the second positive current is equivalent to the target current corresponding to the maximum voltage.

11. The operating method of claim 10, further comprising:
when a level of the charging current is greater than a level of the target current, transmitting, by the application processor, information issuing a command to decrease an output current to the external power source; and
when the level of the charging current is less than the level of the target current, transmitting, by the application processor, information issuing a command to increase the output current to the external power source.

12. The operating method of claim 11, further comprising:
increasing a count value by one when transmitting the information issuing the command to decrease the output current and when transmitting the information issuing the command to increase the output current, and
when the count value is greater than a predefined first number of times, bypassing the transmitting the information.

13. The operating method of claim 12, further comprising:
comparing, by the application processor, a level of a first varied charging current with the level of the target current in response to transmitting the information issuing the command to decrease the output current, and
when the level of the first varied charging current is less than the level of the target current, entering the sleep mode; and
comparing, by the application processor, a level of a second varied charging current with the level of the target current in response to transmitting the information issuing the command to increase the output current, and
when the level of the second varied charging current is greater than the level of the target current, entering the sleep mode.

14. The operating method of claim 12, further comprising:
when the level of the charging current is less than an upper bound of the target current and is greater than a lower bound of the target current, entering the sleep mode.

15. The operating method of claim 14, further comprising:
when the level of the charging current is less than the lower bound of the target current, transmitting, by the application processor, information issuing a command to decrease an output voltage to the external power source.

16. The operating method of claim 14, further comprising:
when the level of the charging current is greater than the upper bound of the target current, determining, by the application processor, whether the count value is 0; and when the count value is 0, again issuing the request to output the maximum voltage corresponding to the target current to the external power source.

17. The operating method of claim 16, further comprising:
when the count value is not 0, transmitting information issuing a command to decrease an output voltage to the external power source.

18. The operating method of claim 10, further comprising:
identifying, by the application processor, entering a constant voltage period during which a battery voltage is maintained to be constant; and
in response to the identification, periodically releasing the sleep mode at predefined times and monitoring a reduction in level of the charging current.

19. A charging integrated circuit (IC) comprising:
a direct charging circuit configured to charge a battery; and
a microprocessor configured to issue a request to output a maximum voltage corresponding to a target current to an external power source, perform a ramp-up operation on a charging current input to the charging IC based on the maximum voltage, compensate for a difference between the charging current and the target current in response to the charging current entering a constant current period, and entering a sleep mode during the constant current period in response to the charging current reaching the target current,
wherein the ramp-up operation includes increasing the charging current from a first positive current at a first time to a second positive current at a subsequent second time, and
wherein the second positive current is equivalent to the target current corresponding to the maximum voltage.

20. The charging IC of claim 19, wherein when a level of the charging current is greater than a level of the target current, the microprocessor is configured to transmit information issuing a command to decrease an output current to the external power source, and
when the level of the charging current is less than the level of the target current, the microprocessor is configured to transmit information issuing a command to increase the output current to the external power source.

* * * * *